US008596575B2

(12) United States Patent
Ito et al.

(10) Patent No.: US 8,596,575 B2
(45) Date of Patent: Dec. 3, 2013

(54) AIRCRAFT ACTUATOR

(75) Inventors: Koji Ito, Gifu (JP); Kazuyuki Suzuki, Gifu (JP)

(73) Assignee: Nabtesco Corporation, Tokyo (JP)

( * ) Notice: Subject to any disclaimer, the term of this patent is extended or adjusted under 35 U.S.C. 154(b) by 77 days.

(21) Appl. No.: 13/344,204

(22) Filed: Jan. 5, 2012

(65) Prior Publication Data

US 2012/0181382 A1 Jul. 19, 2012

(30) Foreign Application Priority Data

Jan. 19, 2011 (JP) ................................ 2011-008709

(51) Int. Cl.

| | |
|---|---|
| ***B64C 3/38*** | (2006.01) |
| ***B64C 5/10*** | (2006.01) |
| ***B64C 9/00*** | (2006.01) |
| ***B64C 13/00*** | (2006.01) |

(52) U.S. Cl.

USPC ........................................ 244/99.3; 244/99.2

(58) Field of Classification Search

USPC ............ 244/99.2–99.5, 78.1; 137/625, 899.2; 91/508, 511, 523, 528

See application file for complete search history.

(56) References Cited

U.S. PATENT DOCUMENTS

| | | | | |
|---|---|---|---|---|
| 2,597,420 | A * | 5/1952 | Westbury | 60/405 |
| 2,637,341 | A * | 5/1953 | Borst | 137/625.64 |
| 5,687,554 | A * | 11/1997 | Brown | 53/589 |
| 6,685,138 | B1 | 2/2004 | Krantz | |
| 7,059,563 | B2 * | 6/2006 | Huynh | 244/99.5 |
| 2004/0245386 | A1 * | 12/2004 | Huynh | 244/75 R |
| 2008/0185476 | A1 | 8/2008 | Suisse et al. | |

FOREIGN PATENT DOCUMENTS

JP 2003-184822 A 7/2003

* cited by examiner

*Primary Examiner* — Philip J Bonzell

(74) *Attorney, Agent, or Firm* — Studebaker & Brackett PC

(57) ABSTRACT

A plurality of tandem actuators including piston rods in each of which two pistons are provided in series are disposed in parallel. A rod end portion couples the piston rods of the plurality of tandem actuators on the outside of case portions and can be rotatably linked to a control surface. For each of the tandem actuators, first hydraulic chambers on the side opposite to the rod end portion side are in communication with each other in the two piston movement areas, respectively, and second hydraulic chambers on the rod end portion side are in communication with each other in the two pistons areas, respectively.

5 Claims, 3 Drawing Sheets

AIRCRAFT ACTUATOR

CROSS-REFERENCE TO RELATED APPLICATIONS

This application claims priority to Japanese Patent Application No. 2011-008709. The entire disclosure of Japanese Patent Application No. 2011-008709 is hereby incorporated herein by reference.

BACKGROUND OF THE INVENTION

1. Field of the Invention

The present invention relates to a hydraulically operated aircraft actuator for driving a control surface of an aircraft.

2. Description of Related Art

An aircraft is provided with control surfaces that are formed as moving surfaces (flight control surfaces) and are configured as an aileron, an elevator, a rudder, and the like. Also, a hydraulically operated actuator (aircraft actuator) is attached to a control surface, and the control surface is driven by the aircraft actuator. As such hydraulically operated aircraft actuators capable of driving a control surface, those disclosed in Japanese Patent No. 3652642, U.S. Pat. No. 6,685,138, and U.S. Patent Application Publication No. 2008/0185476 are known.

Japanese Patent No. 3652642 and U.S. Pat. No. 6,685,138 disclose, as aircraft actuators, tandem actuators that are configured as a single cylinder mechanism including a piston rod provided with two pistons aligned in series. U.S. Patent Application Publication No. 2008/0185476 discloses an aircraft actuator having a structure in which two cylinder mechanisms each including a piston rod provided with a single piston are provided and the piston rods of the cylinder mechanisms are coupled at their ends. With the use of aircraft actuators as disclosed in Japanese Patent 3652642, U.S. Pat. No. 6,685,138, and U.S. Patent Application Publication No. 2008/0185476, it is possible to obtain an increased output due to an increased pressure receiving area.

SUMMARY OF THE INVENTION

Recently, there is a demand for coping with thinned wings, i.e., the reduction of the wing thickness, for the purpose of increasing the efficiency of the aircraft body to increase the fuel efficiency. Also, to install an aircraft actuator inside a thinned wing, it is very important to reduce the size of a high-output aircraft actuator. For this reason, there is a need to realize a reduction in size of a high-output aircraft actuator more efficiently than with aircraft actuators having structures as disclosed in Japanese Patent No. 3652642, U.S. Pat. No. 6,685,138, and U.S. Patent Application Publication No. 2008/0185476. When realizing the size reduction for a high-output aircraft actuator, it is also important that the stability and the reliability of control surface driving can be readily ensured.

In view of the foregoing circumstances, it is an object of the present invention to provide an aircraft actuator that can efficiently realize a reduction in size of a high-output aircraft actuator such that the aircraft actuator can be installed inside a wing with a reduced thickness, and also readily ensure the stability and the reliability of control surface driving.

According to a first aspect of an aircraft actuator according to the present invention for achieving the above-described object, there is provided a hydraulically operated aircraft actuator for driving a control surface of an aircraft, including: a plurality of tandem actuators each including two pistons and a piston rod that is arranged such that the two pistons are aligned in series, wherein the plurality of tandem actuators are disposed in parallel, each of the plurality of tandem actuators is provided with a case portion inside of which two piston movement areas are defined so as to be aligned in series along the piston rod, each of the piston movement areas being provided as an area in which the piston is moved and that is divided by the piston into a first hydraulic chamber and a second hydraulic chamber, a rod end portion is further provided that couples the respective piston rods of the plurality of tandem actuators on the outside of the case portions and that can be rotatably linked to the control surface, and, for each of the plurality of tandem actuators, the first hydraulic chambers disposed in the piston movement areas, respectively, on the side opposite to the side on which the rod end portion is provided are in communication with each other via a first hydraulic chamber communication path, and the second hydraulic chambers disposed in the piston movement areas, respectively, on the rod end portion side are in communication with each other via a second hydraulic chamber communication path.

With this configuration, the plurality of tandem actuators are provided in parallel. Moreover, in the tandem actuators, two piston movement areas that are divided by the pistons into the first and second hydraulic chambers are provided in series. Accordingly, four hydraulic chambers are disposed in series and the respective four hydraulic chambers are in a state of parallel, and therefore it is possible to achieve a structure in which many hydraulic chambers are disposed densely and compactly. Accordingly, the pressure receiving areas of the pistons can be efficiently increased in smaller areas, thus realizing a reduction in size of a high-output aircraft actuator such that the aircraft actuator can be installed inside a wing with a reduced thickness. Furthermore, due to the provision of the plurality of tandem actuators, it is possible to realize redundancy for the aircraft actuator whose size has been reduced, thus also readily ensuring the reliability of control surface driving.

Further, the respective piston rods of the plurality of tandem actuators are coupled by the rod end portion that can be rotatably linked to the control surface. Accordingly, it is possible to prevent the occurrence of a force fight in which the plurality of tandem actuators bias the control surface in opposite directions due to displacement between the positions of the piston rods. Furthermore, for each of the tandem actuators, the first hydraulic chambers that are disposed in the piston movement areas on the side opposite to the rod end portion side are in communication with each other, and the second hydraulic chambers that are disposed in the piston movement areas on the rod end portion side are in communication with each other. Accordingly, the states of pressures exerted on the two pistons can be readily synchronized in the tandem actuators. Thus, these configurations enable the stability of control surface driving to be readily ensured.

Therefore, with the above-described configuration, it is possible to provide an aircraft actuator that can efficiently realize a reduction in size of a high-output aircraft actuator such that the aircraft actuator can be installed inside a wing with a reduced thickness, and also readily ensure the stability and the reliability of control surface driving.

According to a second aspect of an aircraft actuator according to the present invention, in the aircraft actuator of the first aspect, the rod end portion is provided as a block-shaped member that couples ends of the plurality of piston rods, and holds a plurality of bearing portions that are disposed respectively on axial extensions of the plurality of piston rods and are linked to the control surface side.

With this configuration, the plurality of bearing portions that can be linked to the control surface side can be held by the block-shaped rod end portion, and the bearing portions can be disposed on the axial extensions of the piston rods. Accordingly, it is possible to suppress the biasing forces from the tandem actuators from acting on the control surface at positions displaced from the axial extensions of the piston rods. That is, it is possible to achieve a structure in which the biasing forces from the tandem actuators efficiently act on the axial directions of the piston rods.

According to a third aspect of an aircraft actuator according to the present invention, the aircraft actuator of the first aspect further includes a state switching valve that is disposed between a control valve for controlling supply and discharge of pressure oil in the first hydraulic chambers and the second hydraulic chambers and the first hydraulic chambers and the second hydraulic chambers, and that is provided with a plurality of switching positions to allow switching of the state of connection to the first hydraulic chambers and the second hydraulic chambers, wherein the state switching valve is provided with, as the switching positions: a control valve connection position to connect the control valve to all of the first hydraulic chambers and all of the second hydraulic chambers; and a damping position to connect the first hydraulic chambers to the second hydraulic chambers in at least one of the plurality of tandem actuators so as to provide communication between the first hydraulic chambers and the second hydraulic chambers via an orifice.

With this configuration, the state switching valve that allows switching of the state of connection to the first and second hydraulic chambers is provided between the control valve and the first and second hydraulic chambers. In addition to the control valve connection position, the damping position to provide communication between the first and second hydraulic chambers via the orifices is provided as a switching position of the state switching valve in at least one of the plurality of tandem actuators. Accordingly, a damping function can be realized by switching the state switching valve to the damping position. Depending on the relationship between the rigidity of the control surface and the aerodynamic drag exerted on the control surface, there is the possibility that pulsation of the control surface may occur during operation of the control surface. In such a case, for example, when a plurality of aircraft actuators are installed for driving a single control surface, switching the state switching valve of any one of the aircraft actuators to the damping position can suppress pulsation of the control surface by the damping function. Alternatively, it is also possible to suppress pulsation of a control surface by setting the state switching valve such that it can be switched to a damping position to provide communication between the first and second hydraulic chambers of any one of a plurality of tandem actuators via an orifice in a single aircraft actuator. Alternatively, it is also possible to suppress pulsation of a control surface by setting the state switching valve such that it can be switched to a damping position to provide communication between the first and second hydraulic chambers of any one of the tandem actuators via an orifice. Thus, with this configuration, it is also possible to improve the stability of control surface driving for a high-output aircraft actuator whose size has been effectively reduced.

According to a fourth aspect of an aircraft actuator according to the present invention, in the aircraft actuator of the first aspect, in the plurality of tandem actuators, the first hydraulic chambers are in communication with each other and the second hydraulic chambers are in communication with each other in first piston movement areas, which are the piston movement areas disposed on the side opposite to the rod end portion side, and the first hydraulic chambers are in communication with each other and the second hydraulic chambers are in communication with each other in second piston movement areas, which are the piston movement areas disposed on the rod end portion side.

With this configuration, between the plurality of tandem actuators, the corresponding first hydraulic chambers and the corresponding second hydraulic chambers are configured to be in communication with each other on the rod end portion side and the side opposite thereto. Accordingly, for an aircraft actuator including a plurality of tandem actuators, it is possible to simplify the configuration of the oil passages for supply and discharge of pressure oil in the first hydraulic chambers and the second hydraulic chambers.

According to a fifth aspect of an aircraft actuator according to the present invention, in the aircraft actuator of the fourth aspect, the case portions of the plurality of tandem actuators are formed integrally, and a communication passage that provides communication between the first hydraulic chambers and between the second hydraulic chambers of the first piston movement areas and a communication passage that provides communication between the first hydraulic chambers and between the second hydraulic chambers of the second piston movement areas are formed through the integrally formed case portions.

With this configuration, the case portions of the plurality of tandem actuators are formed integrally, and therefore it is possible to reduce the number of components and simplify the structure. Also, between the plurality of tandem actuators, the communication passages that provide communication between the corresponding first hydraulic chambers and between the corresponding second hydraulic chambers on the rod end portion side and the side opposite thereto are formed through the integrated case portions. Accordingly, it is possible to further simplify the configuration of the oil passages for supply and discharge of pressure oil in the hydraulic chambers.

It should be appreciated that the above and other objects, and features and advantages of the present invention will become apparent from the following description taken in conjunction with the accompanying drawings.

DETAILED DESCRIPTION OF THE INVENTION

Hereinafter, an embodiment for carrying out the present invention will be described with reference to the accompanying drawings. It should be appreciated that the present invention is not limited to the configurations illustrated in the following embodiment, and can be widely applied to a hydraulically operated aircraft actuator for driving a control surface of an aircraft.

Figure 1:
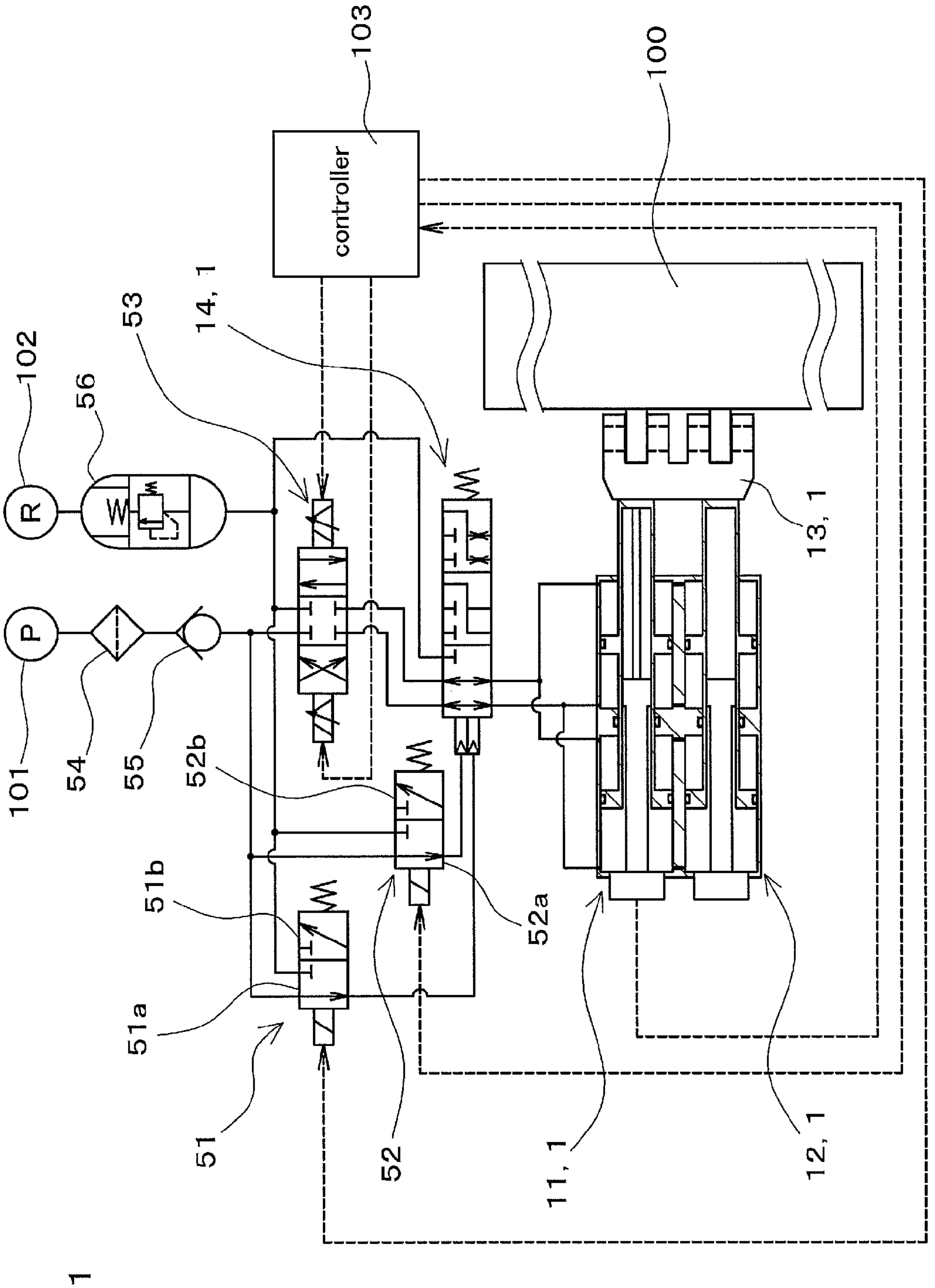
FIG. 1 is a hydraulic circuit diagram schematically showing a hydraulic circuit to which an aircraft actuator according to one embodiment of the present invention is applied.

FIG. 1 is a hydraulic circuit diagram schematically showing a hydraulic circuit to which an aircraft actuator 1 according to one embodiment of the present invention is applied. The hydraulic circuit shown in FIG. 1 is configured as a circuit for operating the hydraulically operated aircraft actuator 1 according to this embodiment for driving a control surface 100 of an aircraft (not shown). Note that the control surface 100 is provided as a moving surface (flight control surface) of the aircraft, and may be configured, for example, as an aileron provided in the main wing, an elevator provided in the tailplane, a rudder provided in the vertical tail, or the like.

Figure 2:
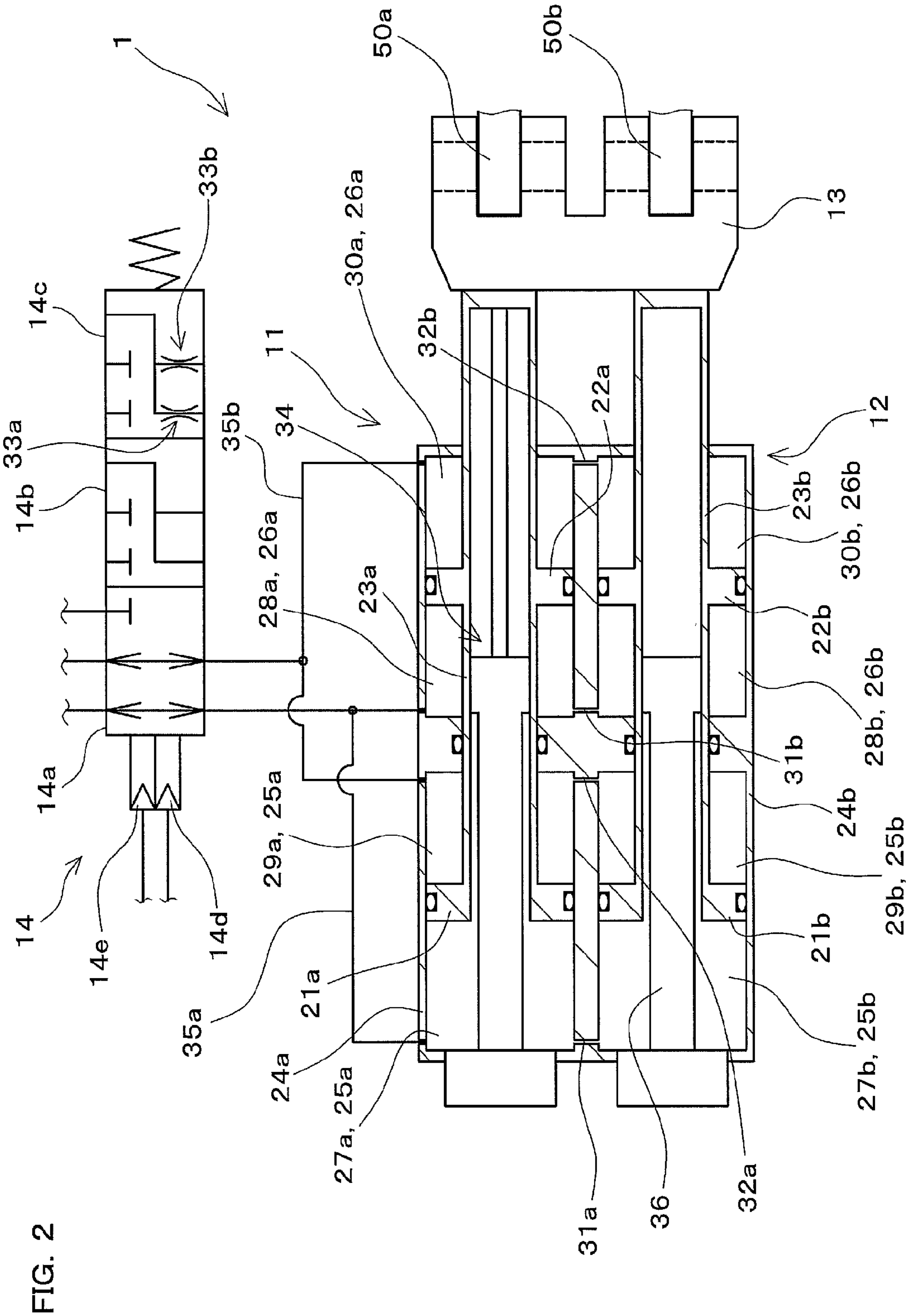
FIG. 2 is an enlarged view of the aircraft actuator in the hydraulic circuit diagram shown in FIG. 1.

FIG. 2 is an enlarged view of the aircraft actuator 1 in the hydraulic circuit diagram shown in FIG. 1. As shown in FIGS. 1 and 2, the aircraft actuator 1 includes a first tandem actuator 11 and a second tandem actuator 12, which are provided as a plurality of tandem actuators (11, 12), a rod end portion 13, and a state switching valve 14. From the viewpoint of realizing redundancy for the drive mechanism, the control surface 100 is configured to be driven not only by the aircraft actuator 1 shown in FIGS. 1 and 2, but also by another aircraft actuator 1 (not shown) having the same configuration.

In the aircraft actuator 1, the first tandem actuator 11 includes two pistons (21*a*, 22*a*), namely a first piston 21*a* and a second piston 22*a*, a piston rod 23*a*, a first case portion (case portion) 24*a*, and so forth. On the other hand, the second tandem actuator 12 includes two pistons (21*b*, 22*b*), namely a first piston 21*b* and a second piston 22*b*, a piston rod 23*b*, a second case portion (case portion) 24*b*, and so forth. The plurality of tandem actuators (11, 12) are disposed in parallel such that the axial directions of the piston rod 23*a* and the piston rod 23*b* are disposed in a state of parallel.

In the first tandem actuator 11, the piston rod 23*a* is formed in the shape of a cylinder that is provided so as to be open at one end. The piston rod 23*a* is provided with the two pistons (21*a*, 22*a*) such that they are aligned in series in the axial direction. Also, the rod end portion 13, which will be described later, is fixed at one end of the piston rod 23*a* on the side opposite to the open end side. Installed inside the piston rod 23*a* is a position detection sensor 34 that has a support shaft structure for slidably supporting the piston rod 23*a* with respect to the first case portion 24*a* from inside and that detects a relative position of the piston rod 23*a* with respect to the first case portion 24*a*.

The first piston 21*a* and the second piston 22*a* are each formed in the shape of a disc that is fixed to the outer circumference of the cylindrical piston rod 23*a* integrally or as separate members. For example, the first piston 21*a*, which is provided on the open end side of the piston rod 23*a*, is formed integrally with the piston rod 23*a*. On the other hand, the second piston 22*a*, which is disposed in an axially intermediate portion of the piston rod 23*a*, is provided as a ring-shaped member into which the piston rod 23*a* is inserted, and is fixed to the outer circumference of the piston rod 23*a* via a seal (not shown).

Inside the first case portion 24*a* of the first tandem actuator 11, two piston movement areas (25*a*, 26*a*), which are provided as areas in which the pistons (21*a*, 22*a*) are moved, are defined such that they are aligned in series along the piston rod 23*a*. A first piston movement area 25*a*, which is an area in which the first piston 21*a* is moved, and a second piston movement area 26*a*, which is an area in which the second piston 22*a* is moved, are provided as the piston movement areas (25*a*, 26*a*).

The first piston movement area 25*a* is configured as an area that is divided by the first piston 21*a* into a first hydraulic chamber 27*a* and a second hydraulic chamber 29*a* in the first case portion 24*a*. With respect to the first piston 21*a*, the first hydraulic chamber 27*a* is disposed on the side opposite to the rod end portion 13 side, and the second hydraulic chamber 29*a* is disposed on the rod end portion 13 side.

The second piston movement area 26*a* is configured as an area that is divided by the second piston 22*a* into a first hydraulic chamber 28*a* and a second hydraulic chamber 30*a* in the first case portion 24*a*. With respect to the second piston 22*a*, the first hydraulic chamber 28*a* is disposed on the side opposite to the rod end portion 13 side, and the second hydraulic chamber 30*a* is disposed on the rod end portion 13 side.

The first hydraulic chamber 27*a* of the first piston movement area 25*a* and the first hydraulic chamber 28*a* of the second piston movement area 26*a* are in communication via a first hydraulic chamber communication path 35*a*. On the other hand, the second hydraulic chamber 29*a* of the first piston movement area 25*a* and the second hydraulic chamber 30*a* of the second piston movement area 26*a* are in communication via a second hydraulic chamber communication path 35*b*. That is, in the first tandem actuator 11, the first hydraulic chambers (27*a*, 28*a*) that are disposed in the piston movement areas (25*a*, 26*a*), respectively, on the side opposite to the rod end portion 13 side are in communication with each other via the first hydraulic chamber communication path 35*a*, and the second hydraulic chambers (29*a*, 30*a*) that are disposed in the piston movement areas (25*a*, 26*a*), respectively, on the rod end portion 13 side are in communication with each other via the second hydraulic chamber communication path 35*b*.

Although FIGS. 1 and 2 schematically show the cross-sectional structure of the first tandem actuator 11, the first tandem actuator 11 is configured such that the sum total of the pressure receiving areas of the first hydraulic chamber 27*a* and the first hydraulic chamber 28*a* and the sum total of the pressure receiving areas of the second hydraulic chamber 29*a* and the second hydraulic chamber 30*a* are substantially the same. This makes it possible to achieve a configuration in which the first piston 21*a* is provided at an end of the piston rod 23*a*, thus making the total length of the first tandem actuator 11 short.

In the second tandem actuator 12, the piston rod 23*b* is formed in the shape of a cylinder that is provided so as to be open at one end. The piston rod 23*b* is provided with the two pistons (21*b*, 22*b*) such that they are aligned in series in the axial direction. Also, the rod end portion 13, which will be described later, is fixed at one end of the piston rod 23*b* on the side opposite to the open end side. Installed inside the piston rod 23*b* is a support shaft 36 for slidably supporting the piston rod 23*b* with respect to the second case portion 24*b* from inside.

The first piston 21*b* and the second piston 22*b* are each formed in the shape of a disc that is fixed to the outer circumference of the cylindrical piston rod 23*b* integrally or as separate members. For example, the first piston 21*b*, which is provided on the open end side of the piston rod 23*b*, is formed integrally with the piston rod 23*b*. On the other hand, the second piston 22*b*, which is disposed in an axially intermediate portion of the piston rod 23*b*, is provided as a ring-shaped member in which the piston rod 23*b* is inserted, and is fixed to the outer circumference of the piston rod 23*b* via a seal (not shown).

Inside the second case portion 24*b* of the second tandem actuator 12, two piston movement areas (25*b*, 26*b*), which are provided as areas in which the pistons (21*b*, 22*b*) are moved, are defined such that they are aligned in series along the piston rod 23*b*. A first piston movement area 25*b*, which is an area in which the first piston 21*b* is moved, and a second piston movement area 26*b*, which is an area in which the second piston 22*b* is moved, are provided as the piston movement areas (25*b*, 26*b*).

The first piston movement area 25*b* is configured as an area that is divided by the first piston 21*b* into a first hydraulic chamber 27*b* and a second hydraulic chamber 29*b* in the second case portion 24*b*. With respect to the first piston 21*b*, the first hydraulic chamber 27*b* is disposed on the side opposite to the rod end portion 13 side, and the second hydraulic chamber 29*b* is disposed on the rod end portion 13 side.

The second piston movement area 26*b* is configured as an area that is divided by the second piston 22*b* into a first hydraulic chamber 28*b* and a second hydraulic chamber 30*b* in the second case portion 24*b*. With respect to the second piston 22*b*, the first hydraulic chamber 28*b* is disposed on the side opposite to the rod end portion 13 side, and the second hydraulic chamber 30*b* is disposed on the rod end portion 13 side.

The first hydraulic chamber 27*b* of the first piston movement area 25*b* in the second tandem actuator 12 is in communication with the first hydraulic chamber 27*a* of the first piston movement area 25*a* in the first tandem actuator 11 via a first communication passage 31*a* formed in the first case portion 24*a* and the second case portion 24*b*. Also, the second hydraulic chamber 29*b* of the first piston movement area 25*b* in the second tandem actuator 12 is in communication with the second hydraulic chamber 29*a* of the first piston movement area 25*a* in the first tandem actuator 11 via a second communication passage 32*a* formed in the first case portion 24*a* and the second case portion 24*b*.

Furthermore, the first hydraulic chamber 28*b* of the second piston movement area 26*b* in the second tandem actuator 12 is in communication with the first hydraulic chamber 28*a* of the second piston movement area 26*a* in the first tandem actuator 11 via a first communication passage 31*b* formed in the first case portion 24*a* and the second case portion 24*b*. The second hydraulic chamber 30*b* of the second piston movement area 26*b* in the second tandem actuator 12 is in communication with the second hydraulic chamber 30*a* of the second piston movement area 26*a* in the first tandem actuator 11 via a second communication passage 32*b* formed in the first case portion 24*a* and the second case portion 24*b*.

Accordingly, in the plurality of tandem actuators (11, 12), the first hydraulic chambers (27*a*, 27*b*) are in communication with each other and the second hydraulic chambers (29*a*, 29*b*) are in communication with each other in the first piston movement areas (25*a*, 25*b*), which are the areas disposed on the side opposite to the rod end portion 13 side. The first hydraulic chambers (28*a*, 28*b*) are in communication with each other and the second hydraulic chambers (30*a*, 30*b*) are in communication with each other in the second piston movement areas (26*a*, 26*b*), which are the areas disposed on the rod end portion 13 side.

The first case portion 24*a* and the second case portion 24*b* of the plurality of tandem actuators (11, 12) are formed integrally. Also, the first communication passage 31*a* and the second communication passage 32*a* that provide communication between the first hydraulic chambers (27*a*, 27*b*) and between the second hydraulic chambers (29*a*, 29*b*) of the first piston movement areas (25*a*, 25*b*) are formed through the first case portion 24*a* and the second case portion 24*b* that are formed integrally. The first communication passage 31*b* and the second communication passage 32*b* that provide communication between the first hydraulic chambers (28*a*, 28*b*) and between the second hydraulic chambers (30*a*, 30*b*) in the second piston movement areas (26*a*, 26*b*) are also formed through the first case portion 24*a* and the second case portion 24*b* that are formed integrally.

Although the first case portion 24*a* and the second case portion 24*b* of the plurality of tandem actuators (11, 12) are formed integrally in this embodiment, this need not be the case. That is, the first case portion 24*a* and the second case portion 24*b* may be formed as separate members.

The first hydraulic chamber 27*b* of the first piston movement area 25*b* and the first hydraulic chamber 28*b* of the second piston movement area 26*b* in the second tandem actuator 12 are in communication via the first hydraulic chambers (27*a*, 28*a*), the first communication passages (31*a*, 31*b*), and the first hydraulic chamber communication path 35*a* of the first tandem actuator 11. On the other hand, the second hydraulic chamber 29*b* of the first piston movement area 25*b* and the second hydraulic chamber 30*b* of the second piston movement area 26*b* are in communication via the second hydraulic chambers (29*a*, 30*a*), the second communication passages (32*a*, 32*b*), and the second hydraulic chamber communication path 35*b* of the first tandem actuator 11. That is, in the second tandem actuator 12, the first hydraulic chambers (27*b*, 28*b*) that are disposed in the piston movement areas (25*b*, 26*b*), respectively, on the side opposite to the rod end portion 13 side are in communication with each other via the first hydraulic chamber communication path 35*a* and so forth, and the second hydraulic chambers (29*b*, 30*b*) that are disposed in the piston movement areas (25*b*, 26*b*), respectively, on the rod end portion 13 side are in communication with each other via the second hydraulic chamber communication path 35*b* and so forth.

Although FIGS. 1 and 2 schematically show the cross-sectional structure of the second tandem actuator 12, the second tandem actuator 12 is configured such that the sum total of the pressure receiving areas of the first hydraulic chamber 27*b* and the first hydraulic chamber 28*b* and the sum total of the pressure receiving areas of the second hydraulic chamber 29*b* and the second hydraulic chamber 30*b* are substantially the same. This makes it possible to achieve a configuration in which the first piston 21*b* is provided at an end of the piston rod 23*b*, thus making the total length of the second tandem actuator 12 short.

The rod end portion 13 is configured to couple the respective piston rods (23*a*, 23*b*) of the plurality of tandem actuators (11, 12) on the outside of the case portions (24*a*, 24*b*) and to be rotatably linked to the control surface 100. Also, the rod end portion 13 is provided as a block-shaped member that couples ends of the plurality of piston rods (23*a*, 23*b*).

Further, the rod end portion 13 is configured to hold a plurality of bearing portions (50*a*, 50*b*) that are connected on the control surface 100 side. A bearing portion 50*a* is disposed on the axial extension of the piston rod 23*a*. On the other hand, a bearing portion 50*b* is disposed on the axial extension of the piston rod 23*b*. The bearing portion 50*a* and the bearing portion 50*b* are disposed on the rotation centerline of the rod end portion 13 that can be rotatably linked to the control surface 100.

As shown in FIG. 1, pressure oil is supplied to the plurality of tandem actuators (11, 12) from an aircraft central hydraulic power source 101, and the pressure oil discharged from the tandem actuators (11, 12) is discharged to a reservoir circuit 102. The aircraft central hydraulic power source 101 includes a hydraulic pump for supplying pressure oil (hydraulic fluid), and is installed on the body side of the aircraft (not shown). Note that the aircraft central hydraulic power source 101 is configured to supply pressure oil also to an aircraft actuator (not shown) for driving a control surface other than the control surface 100.

The reservoir circuit 102 includes a tank (not shown) into which pressure oil that is supplied as the pressure oil from the aircraft central hydraulic power source 101 and is thereafter discharged from the plurality of tandem actuators (11, 12)

flows back, and the reservoir circuit 102 is configured to be in communication with the aircraft central hydraulic power source 101. Consequently, the pressure of the oil that has returned to the reservoir circuit 102 is raised by the aircraft central hydraulic power source 101 and the oil is supplied to the plurality of tandem actuators (11, 12).

Supply of the pressure oil from the aircraft central hydraulic power source 101 to the plurality of tandem actuators (11, 12) and discharge of the pressure oil from the plurality of tandem actuators (11, 12) to the reservoir circuit 102 are performed via a control valve 53 and the state switching valve 14 of the aircraft actuator 1. Additionally, a filter 54 for removing foreign matter contained in the oil and a check valve 55 that permits flow of pressure oil from the aircraft central hydraulic power source 101 and prevents flow of the oil in a direction flowing back to the aircraft central hydraulic power source 101 are provided between the aircraft central hydraulic power source 101 and the control valve 53. An accumulator 56 including a relief valve is provided between the reservoir circuit 102 and the control valve 53. By provision of the accumulator 56 in this way, the pressure of the pressure oil in the circuit on the upstream side of the accumulator 56 (the side opposite to the side in communication with the reservoir circuit 102) is maintained at a pressure equal to or greater than a relief pressure generated by the relief valve of the accumulator 56.

The control valve 53 is provided as a valve mechanism for controlling supply and discharge of the pressure oil in the first hydraulic chambers (27*a*, 27*b*, 28*a*, 28*b*) and the second hydraulic chambers (29*a*, 29*b*, 30*a*, 30*b*) of the plurality of tandem actuators (11, 12). The control valve 53 is provided, for example, as an electrohydraulic servo valve (EHSV), is configured such that the position of its spool (not shown) can be proportionally switched, and is driven based on a command signal from a controller 103 that controls the operation of the plurality of tandem actuators (11, 12).

The control valve 53 is switched based on a command signal from the controller 103, and thereby the pressure oil is supplied from the aircraft central hydraulic power source 101 to one of the first hydraulic chamber communication path 35*a* and the second hydraulic chamber communication path 35*b* and the pressure oil is discharged from the other of the first hydraulic chamber communication path 35*a* and the second hydraulic chamber communication path 35*b*.

By supply of the pressure oil to the first hydraulic chamber communication path 35*a*, the pressure oil is supplied to the first hydraulic chambers (27*a*, 27*b*, 28*a*, 28*b*). When the pressure oil is supplied to the first hydraulic chamber communication path 35*a*, the pressure oil is discharged from the second hydraulic chambers (29*a*, 29*b*, 30*a*, 30*b*) via the second hydraulic chamber communication path 35*b*. On the other hand, by supply of the pressure oil to the second hydraulic chamber communication path 35*b*, the pressure oil is supplied to the second hydraulic chambers (29*a*, 29*b*, 30*a*, 30*b*). When the pressure oil is supplied to the second hydraulic chamber communication path 35*b*, the pressure oil is discharged from the first hydraulic chambers (27*a*, 27*b*, 28*a*, 28*b*) via the first hydraulic chamber communication path 35*a*. Consequently, the piston rod 23*a* is moved relative to the first case portion 24*a*, and the piston rod 23*b* is moved relative to the second case portion 24*b*. Then, the rod end portion 13 that couples ends of the piston rods (23*a*, 23*b*) is moved together with the piston rods (23*a*, 23*b*), and thereby the control surface 100 is driven.

The controller 103 for driving the control valve 53 drives the control valve 53 based on a command signal from a superordinate computer (not shown) that commands the operation of the control surface 100, thus controlling the operation of the plurality of tandem actuators (11, 12). The controller 103 is configured to receive input of a position detection signal that is detected by the position detection sensor 34 provided in the first tandem actuator 11. Also, the controller 103 is configured to perform a feedback control of the position of the piston rod 23*a* based on the command signal from the superordinate computer for operation of the control surface 100 and the position detection signal from the position detection sensor 34.

As described above, the first hydraulic chambers (27*a*, 27*b*) are in communication with each other and the second hydraulic chambers (29*a*, 29*b*) are in communication with each other in the first piston movement areas (25*a*, 25*b*), and the first hydraulic chambers (28*a*, 28*b*) are in communication with each other and the second hydraulic chambers (30*a*, 30*b*) are in communication with each other in the second piston movement areas (26*a*, 26*b*). Also, the piston rod 23*a* and the piston rod 23*b* are coupled integrally at the rod end portion 13. Accordingly, by performing the feedback control of the position of the piston rod 23*a*, the position of the piston rod 23*b* is also controlled at the same time.

The state switching valve 14 of the aircraft actuator 1 is disposed between the control valve 53 and the first hydraulic chambers (27*a*, 27*b*, 28*a*, 28*b*) and the second hydraulic chambers (29*a*, 29*b*, 30*a*, 30*b*) of the plurality of tandem actuators (11, 12). Additionally, a port that is in communication with the first hydraulic chamber communication path 35*a* and a port that is in communication with the second hydraulic chamber communication path 35*b* are formed in the state switching valve 14. Also, the state switching valve 14 is configured as a valve mechanism provided with a plurality of switching positions (14*a*, 14*b*, 14*c*) to allow switching of the state of connection to the first hydraulic chambers (27*a*, 27*b*, 28*a*, 28*b*) and the second hydraulic chambers (29*a*, 29*b*, 30*a*, 30*b*).

The state switching valve 14 is provided with, as the above-mentioned switching positions (14*a*, 14*b*, 14*c*), a control valve connection position 14*a*, a bypass position 14*b*, and a damping position 14*c*.

The control valve connection position 14*a* is provided as a switching position to connect one port of the control valve 53 to the first hydraulic chamber communication path 35*a*, and connect the other port of the control valve 53 to the second hydraulic chamber communication path 35*b*. That is, the control valve connection position 14*a* is configured to connect the control valve 53 to all of the first hydraulic chambers (27*a*, 27*b*, 28*a*, 28*b*) and all of the second hydraulic chambers (29*a*, 29*b*, 30*a*, 30*b*).

The bypass position 14*b* is provided as a switching position to provide communication between the first hydraulic chamber communication path 35*a* and the second hydraulic chamber communication path 35*b*, and provide communication between the first and second hydraulic chamber communication paths (35*a*, 35*b*) and the reservoir circuit 102. That is, the bypass position 14*b* is configured to provide communication between all of the first hydraulic chambers (27*a*, 27*b*, 28*a*, 28*b*) and all of the second hydraulic chambers (29*a*, 29*b*, 30*a*, 30*b*), and connect them to the reservoir circuit 102.

The damping position 14*c* is provided as a switching position to provide communication between the first hydraulic chamber communication path 35*a* and the second hydraulic chamber communication path 35*b* via an orifice 33*a* and an orifice 33*b*. That is, the damping position 14*c* is configured to connect the first hydraulic chambers (27*a*, 27*b*, 28*a*, 28*b*) to the second hydraulic chambers (29*a*, 29*b*, 30*a*, 30*b*) in the plurality of tandem actuators (11, 12) so as to provide communication between the first hydraulic chambers (27*a*, 27*b*, 28*a*, 28*b*) and the second hydraulic chambers (29*a*, 29*b*, 30*a*, 30*b*) via the orifices (33*a*, 33*b*).

In a state in which the state switching valve 14 is switched to the damping position 14*c*, the first hydraulic chambers (27*a*, 27*b*, 28*a*, 28*b*) are connected to the reservoir circuit 102 via the orifice 33*a*, and the second hydraulic chambers (29*a*, 29*b*, 30*a*, 30*b*) are connected to the reservoir circuit 102 via the orifice 33*b*. Note that the orifices (33*a*, 33*b*) may be a fixed orifice in which the area of its portion where the cross-sectional area of the flow path of pressure oil is reduced is fixed without being varied, or may be a variable orifice that is configured such that the area of its portion where the cross-sectional area of the flow path of pressure oil is reduced is varied by a bimetal mechanism.

Further, the state switching valve 14 is configured such that the operation of switching the switching positions (14*a*, 14*b*, 14*c*) is performed by operating solenoid valves (51, 52) that are driven by the controller 103. As shown in FIG. 1, in the magnetized state, for example, the solenoid valve 51 is switched to a supply position 51*a*. In this state, the pressure oil from the aircraft central hydraulic power source 101 is supplied as pilot pressure oil to a pilot pressure chamber 14*d* for controlling the position of the spool (not shown) of the state switching valve 14 (see FIG. 1 , FIG. 2). On the other hand, in the demagnetized state, for example, the solenoid valve 51 is switched to a discharge position 51*b*. In this state, the pilot pressure oil supplied to the pilot pressure chamber 14*d* is discharged to the reservoir circuit 102.

As shown in FIG. 1, in the magnetized state, for example, the solenoid valve 52 is switched to a supply position 52*a*. In this state, the pressure oil from the aircraft central hydraulic power source 101 is supplied as pilot pressure oil to a pilot pressure chamber 14*e* for controlling the position of the spool (not shown) of the state switching valve 14 (see FIG. 1 , FIG. 2). On the other hand, in the demagnetized state, for example, the solenoid valve 52 is switched to a discharge position 52*b*. In this state, the pilot pressure oil supplied to the pilot pressure chamber 14*e* is discharged to the reservoir circuit 102.

The controller 103 controls the solenoid valves (51, 52) to be magnetized or demagnetized based on a command signal from the superordinate computer that commands the operation of the control surface 100, thus controlling the switching positions (14*a*, 14*b*, 14*c*) of the state switching valve 14. In a state in which both of the solenoid valves (51, 52) are magnetized and switched to the supply positions (51*a*, 52*a*), the state switching valve 14 is maintained in the state of being switched to the control valve connection position 14*a*. In a state in which one of the solenoid valves (51, 52) is magnetized, including, for example, a state in which the solenoid valve 51 is switched to the supply position 51*a* and the solenoid valve 52 is in the discharge position 52*b*, the state switching valve 14 is maintained in the state of being switched to the bypass position 14*b*. In a state in which both of the solenoid valves (51, 52) are demagnetized and switched to the discharge positions (51*b*, 52*b*), the state switching valve 14 is maintained in the state of being switched to the damping position 14*c*.

With the aircraft actuator 1 described thus far, the plurality of tandem actuators (11, 12) are provided in parallel. Moreover, in the tandem actuators (11, 12), two piston movement areas (namely, the piston movement areas 25*a* and 26*a*, or the piston movement areas 25*b* and 26*b*) that are divided by the pistons (21*a*, 22*a*, 21*b*, 22*b*) into the first and second hydraulic chambers (27*a* and 29*a*, 28*a* and 30*a*, 27*b* and 29*b*, 28*b* and 30*b*) are provided in series. Accordingly, four hydraulic chambers (the hydraulic chambers 27*a*, 29*a*, 28*a*, and 30*a*, or the hydraulic chambers 27*b*, 29*b*, 28*b*, and 30*b*) are disposed in series and the respective four hydraulic chambers are in a state of parallel, and therefore it is possible to achieve a structure in which many hydraulic chambers are disposed densely and compactly. Accordingly, the pressure receiving areas of the pistons can be efficiently increased in smaller areas, thus realizing a reduction in size of a high-output aircraft actuator 1 such that the aircraft actuator 1 can be disposed inside a wing with a reduced thickness. Furthermore, due to the provision of the plurality of tandem actuators (11, 12), it is possible to realize redundancy for the aircraft actuator 1 whose size has been reduced, thus also readily ensuring the reliability of control surface driving.

Further, the respective piston rods (23*a*, 23*b*) of the plurality of tandem actuators (11, 12) are coupled by the rod end portion 13 that can be rotatably linked to the control surface 100. Accordingly, it is possible to prevent the occurrence of a force fight in which the plurality of tandem actuators (11, 12) bias the control surface 100 in opposite directions due to displacement between the positions of the piston rods (23*a*, 23*b*). Furthermore, in each of the tandem actuators (11 or 12), the first hydraulic chambers (the hydraulic chambers 27*a* and 28*a*, or the hydraulic chambers 27*b* and 28*b*) that are disposed in the piston movement areas (the piston movement areas (25*a*, 26*a*), or the piston movement areas (25*b*, 26*b*)) on the side opposite to the rod end portion 13 side are in communication with each other, and the second hydraulic chambers (the hydraulic chambers 29*a* and 30*a*, or the hydraulic chambers 29*b* and 30*b*) that are disposed in the piston movement areas (the piston movement areas (25*a*, 26*a*), or the piston movement areas (25*b*, 26*b*)) on the rod end portion 13 side are in communication with each other. Accordingly, the states of pressures exerted on the two pistons (the pistons 21*a* and 22*a*, or the pistons 21*b* and 22*b*) can be readily synchronized in the tandem actuators (11, 12). Thus, these configurations enable the stability of control surface driving to be readily ensured.

Therefore, according to this embodiment, it is possible to efficiently realize a reduction in size of a high-output aircraft actuator 1 such that the aircraft actuator 1 can be installed inside a wing with a reduced thickness, and also readily ensure the stability and the reliability of control surface driving.

With the aircraft actuator 1, the plurality of bearing portions (50*a*, 50*b*) that are linked to the control surface 100 side can be held by the block-shaped rod end portion 13, and the bearing portions (50*a*, 50*b*) can be disposed on the axial extensions of the piston rods (23*a*, 23*b*). Accordingly, it is possible to suppress the biasing forces from the tandem actuators (11, 12) from acting on the control surface 100 at positions displaced from the axial extensions of the piston rods (23*a*, 23*b*). That is, it is possible to achieve a structure in which the biasing forces from the tandem actuators (11, 12) efficiently act on the axial directions of the piston rods (23*a*, 23*b*).

With the aircraft actuator 1, the state switching valve 14 that allows switching of the state of connection to the first and second hydraulic chambers (27*a*, 27*b*, 28*a*, 28*b*, 29*a*, 29*b*, 30*a*, 30*b*) is provided between the control valve 53 and the first and second hydraulic chambers (27*a*, 27*b*, 28*a*, 28*b*, 29*a*, 29*b*, 30*a*, 30*b*). In addition to the control valve connection position 14*a*, the damping position 14*c* to provide communication between the first and second hydraulic chambers (27*a*, 27*b*, 28*a*, 28*b*, 29*a*, 29*b*, 30*a*, 30*b*) via the orifices (33*a*, 33*b*) is provided as a switching position of the state switching valve 14. Accordingly, a damping function can be realized by switching the state switching valve 14 to the damping position 14*c*.

Depending on the relationship between the rigidity of the control surface 100 and the aerodynamic drag exerted on the control surface 100, there is the possibility that pulsation of the control surface 100 may occur during operation of the control surface 100. In such a case, when a plurality of aircraft actuators 1 are installed for driving a single control surface 100 as in this embodiment, switching the state switching valve 14 of any one of the aircraft actuators 1 to the damping position 14*c* can suppress pulsation of the control surface 100 by the damping function. Thus, according to this embodiment, it is also possible to improve the stability of control surface driving for a high-output aircraft actuator 1 whose size has been effectively reduced.

With the aircraft actuator 1, between the plurality of tandem actuators (11, 12), the corresponding first hydraulic chambers (27*a* and 27*b*, 28*a* and 28*b*) and the corresponding second hydraulic chambers (29*a* and 29*b*, 30*a* and 30*b*) are configured to be in communication with each other on the rod end portion 13 side and the side opposite thereto. Accordingly, for an aircraft actuator 1 including a plurality of tandem actuators (11, 12), it is possible to simplify the configuration of the oil passages for supply and discharge of pressure oil in the first hydraulic chambers (27*a*, 27*b*, 28*a*, 28*b*) and the second hydraulic chambers (29*a*, 29*b*, 30*a*, 30*b*).

With the aircraft actuator 1, the case portions (24*a*, 24*b*) of the plurality of tandem actuators (11, 12) are formed integrally, and therefore it is possible to reduce the number of components and simplify the structure. Also, between the plurality of tandem actuators (11, 12), the communication passages (the first communication passages (31*a*, 31*b*), the second communication passages (32*a*, 32*b*)) that provide communication between the corresponding first hydraulic chambers (27*a* and 27*b*, 28*a* and 28*b*) and between the corresponding second hydraulic chambers (29*a* and 29*b*, 30*a* and 30*b*) on the rod end portion 13 side and the side opposite thereto are formed through the integrated case portions (24*a*, 24*b*). Accordingly, it is possible to further simplify the configuration of the oil passages for supply and discharge of pressure oil in the hydraulic chambers (27*a*, 27*b*, 28*a*, 28*b*, 29*a*, 29*b*, 30*a*, 30*b*).

Although an embodiment of the present invention has been described thus far, the present invention is not limited to the embodiment described above, and various modifications may be made within the scope recited in the claims. For example, the following modifications are possible.

(1) Although the above embodiment has been described, taking, as an example, an aircraft actuator including two tandem actuators, this need not be the case. That is, it is possible to implement an aircraft actuator in which three or more tandem actuators are disposed in parallel.

(2) Although the above embodiment has been described, taking, as an example, a configuration in which the case portions respectively provided for the plurality of tandem actuators are formed integrally, this need not be the case. That is, it is possible to adopt a configuration in which case portions that are respectively provided for a plurality of tandem actuators are formed as separate bodies.

(3) Although the above embodiment has been described, taking, as an example, a configuration in which the same hydraulic power source supplies pressure oil to a plurality of tandem actuators, this need not be the case. That is, hydraulic power sources that are different from each other may supply pressure oil to a plurality of tandem actuators.

(4) The configuration of the rod end portion is not limited to the configuration illustrated in the above embodiment, and various modification can be made as long as the rod end portion couples the respective piston rods of the plurality of tandem actuators on the outside of the case portions. It is possible to adopt a configuration in which the number of the bearing portions that are held by the rod end portion and are linked to the control surface side is different from the number of the piston rods.

(5) The configuration of the damping position is not limited to the above-described configuration, and various combinations may be implemented as long as the damping position is configured as a position to connect the first hydraulic chambers to the second hydraulic chambers in at least one of the plurality of tandem actuators so as to provide communication between the first hydraulic chambers and the second hydraulic chambers via an orifice. For example, it is also possible to suppress pulsation of a control surface by setting the state switching valve such that it can be switched to a damping position to provide communication between the first and second hydraulic chambers of any one of a plurality of tandem actuators via an orifice in a single aircraft actuator. Alternatively, it is also possible to suppress pulsation of the control surface by setting the state switching valve such that it can be switched to a damping position to provide communication between the first and second hydraulic chambers of any one of the tandem actuators via an orifice.

Figure 3:
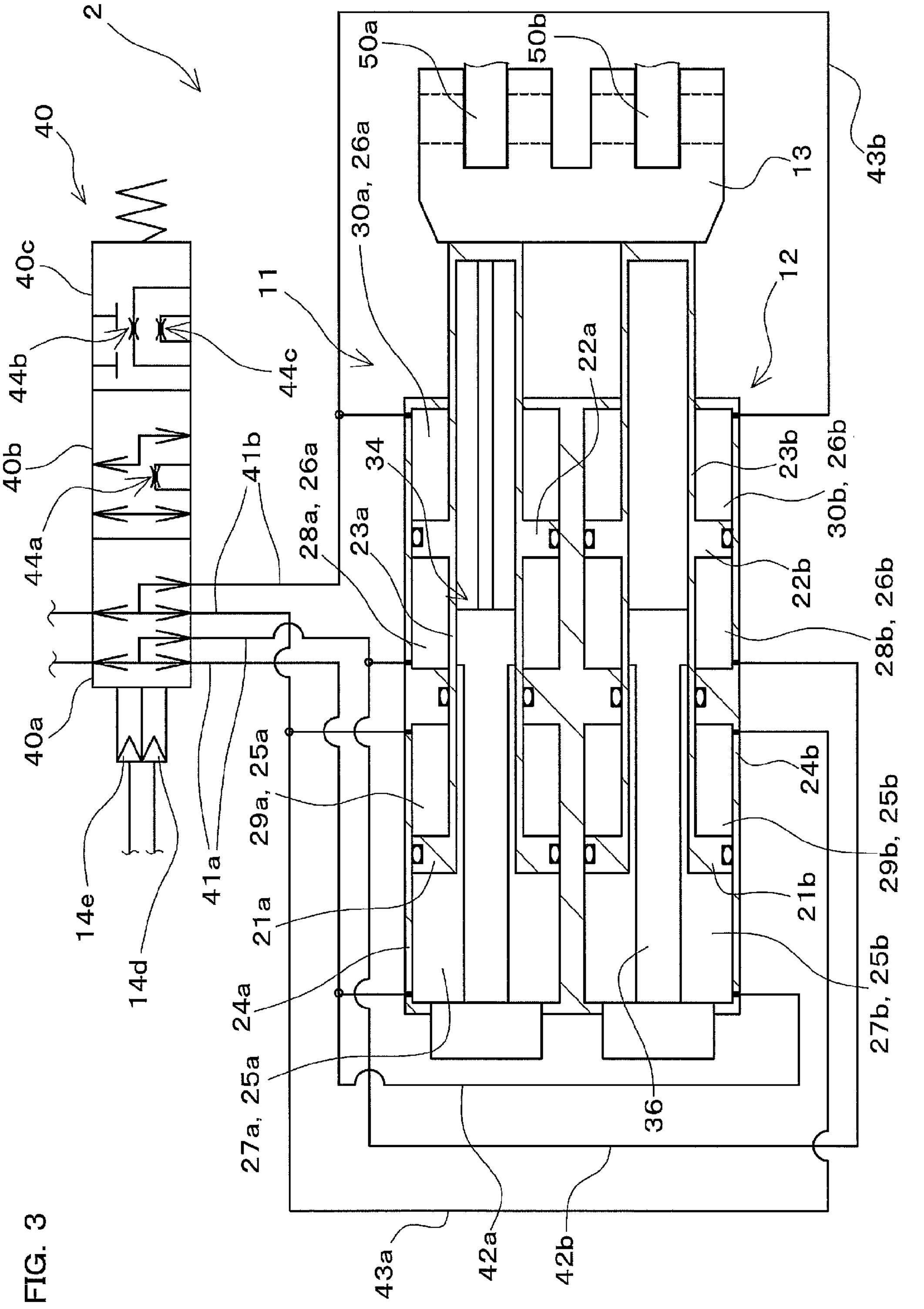
FIG. 3 is a diagram showing an aircraft actuator according to a modification.

(6) FIG. 3 is an enlarged view of an aircraft actuator 2 according to a modification. Note that FIG. 3 is shown as a hydraulic circuit diagram corresponding to FIG. 2. The aircraft actuator 2 according to the modification shown in FIG. 3 is configured in the same manner as the aircraft actuator 1 according to the above-described embodiment in that the plurality of tandem actuators (11, 12) and the rod end portion 13 are provided. However, the aircraft actuator 2 is different from the aircraft actuator 1 according to the above-described embodiment with respect to the configurations of a state switching valve 40, a first hydraulic chamber communication path 41*a*, a second hydraulic chamber communication path 41*b*, first communication passages (42*a*, 42*b*), and second communication passages (43*a*, 43*b*). In the following, only the configurations different from those of the above-described embodiment are described, and the description of components configured in the same manner as in the above-described embodiment is omitted by using the same reference numerals, or by referring to the reference numerals used in the above-described embodiment.

In the aircraft actuator 1, the first communication passages (31*a*, 31*b*) and the second communication passages (32*a*, 32*b*) are formed through the integrally formed case portions (24*a*, 24*b*). However, in the aircraft actuator 2, the first communication passages (42*a*, 42*b*) and the second communication passages (43*a*, 43*b*) are provided as oil passages external to the case portions (24*a*, 42*b*). That is, the first communication passage 42*a* that provides communication between the first hydraulic chambers (27*a*, 27*b*) and the second communication passage 43*a* that provides communication between the second hydraulic chambers (29*a*, 29*b*) in the first piston movement areas (25*a*, 25*b*) on the side opposite to the rod end portion 13 side are provided as oil passages external to the case portions (24*a*, 24*b*). The first communication passage 42*b* that provides communication between the first hydraulic chambers (28*a*, 28*b*) and the second communication passage 43*b* that provides communication between the second hydraulic chambers (30*a*, 30*b*) in the second piston movement areas (26*a*, 26*b*) on the rod end portion 13 side are also provided as oil passages external to the case portions (24*a*, 24*b*).

In the aircraft actuator 2, the first hydraulic chamber communication path 41*a* that provides communication between the first hydraulic chamber 27*a* of the first piston movement area 25*a* and the first hydraulic chamber 28*a* of the second piston movement area 26*a* is configured to pass through the state switching valve 40. Also, the first hydraulic chamber communication path 41*a* is configured to provide communication also between the first hydraulic chamber 27*b* of the first piston movement area 25*b* and the first hydraulic chamber 28*b* of the second piston movement area 26*b* via the state switching valve 40. Note that the first hydraulic chamber communication path 41*a* is configured as a path that connects the first communication passage 42*a* to the first communication passage 42*b* via the state switching valve 40.

The second hydraulic chamber communication path 41*b* that provides communication between the second hydraulic chamber 29*a* of the first piston movement area 25*a* and the second hydraulic chamber 30*a* of the second piston movement area 26*a* is configured to pass through the state switching valve 40. Also, the second hydraulic chamber communication path 41*b* is configured to provide communication also between the second hydraulic chamber 29*b* of the first piston movement area 25*b* and the second hydraulic chamber 30*b* of the second piston movement area 26*b* via the state switching valve 40. Note that the second hydraulic chamber communication path 41*b* is configured as a path that connects the second communication passage 43*a* to the second communication passage 43*b* via the state switching valve 40.

The state switching valve 40 of the aircraft actuator 2 is disposed between the control valve 53 and the first hydraulic chambers (27*a*, 27*b*, 28*a*, 28*b*) and the second hydraulic chambers (29*a*, 29*b*, 30*a*, 30*b*) of the plurality of tandem actuators (11, 12). Additionally, two ports that are in communication with the first hydraulic chamber communication path 41*a* and two ports that are in communication with the second hydraulic chamber communication path 41*b* are formed in the state switching valve 40. Also, the state switching valve 40 is configured as a valve mechanism provided with a plurality of switching positions (40*a*, 40*b*, 40*c*) to allow switching of the state of connection to the first hydraulic chambers (27*a*, 27*b*, 28*a*, 28*b*) and the second hydraulic chambers (29*a*, 29*b*, 30*a*, 30*b*).

The state switching valve 40 is provided with, as the above switching positions (40*a*, 40*b*, 40*c*), a control valve connection position 40*a*, a first damping position 40*b*, and a second damping position 40*c*.

The control valve connection position 40*a* is provided as a switching position to connect one port of the control valve 53 to the two ports that are in communication with the first hydraulic chamber communication path 41*a*, and connect the other port of the control valve 53 to the two ports that are in communication with the second hydraulic chamber communication path 41*b*. That is, the control valve connection position 40*a* is configured to connect the control valve 53 to all of the first hydraulic chambers (27*a*, 27*b*, 28*a*, 28*b*) and all of the second hydraulic chambers (29*a*, 29*b*, 30*a*, 30*b*).

The first damping position 40*b* connects the port that is in communication with the first hydraulic chamber communication path 41*a* on the side connecting to the first communication passage 42*a* to one port of the control valve 53. Furthermore, the first damping position 40*b* connects the port that is in communication with the second hydraulic chamber communication path 41*b* on the side connecting to the second communication passage 43*b* to the other port of the control valve 53. Also, the first damping position 40*b* connects the port that is in communication with the first hydraulic chamber communication path 41*a* on the side connecting to the first communication passage 42*b* to the port that is in communication with the second hydraulic chamber communication path 41*b* on the side connecting to the second communication passage 43*a*, thus providing communication between the first communication passage 42*b* and the second communication passage 43*a* via an orifice 44*a*. Accordingly, the first damping position 40*b* is configured to connect the first hydraulic chambers (28*a*, 28*b*) of the second piston movement areas (26*a*, 26*b*) and the second hydraulic chambers (29*a*, 29*b*) of the first piston movement areas (25*a*, 25*b*) in the two tandem actuators (11, 12) so as to provide communication between the first hydraulic chambers (28*a*, 28*b*) and the second hydraulic chambers (29*a*, 29*b*) via the orifice 44*a*.

The second damping position 40*c* connects the port that is in communication with the first hydraulic chamber communication path 41*a* on the side connecting to the first communication passage 42*a* to the port that is in communication with the second hydraulic chamber communication path 41*b* on the side connecting to the second communication passage 43*b*, thus providing communication between the first communication passage 42*a* and the second communication passage 43*b* via an orifice 44*b*. Accordingly, the second damping position 40*c* is configured to connect the first hydraulic chambers (27*a*, 27*b*) of the first piston movement areas (25*a*, 25*b*) and the second hydraulic chambers (30*a*, 30*b*) of the second piston movement areas (26*a*, 26*b*) in the two tandem actuators (11, 12) so as to provide communication between the first hydraulic chambers (27*a*, 27*b*) and the second hydraulic chambers (30*a*, 30*b*) via the orifice 44*b*.

Further, the second damping position 40*c* connects the port that is in communication with the first hydraulic chamber communication path 41*a* on the side connecting to the first communication passage 42*b* to the port that is in communication with the second hydraulic chamber communication path 41*b* on the side connecting to the second communication passage 43*a*, thus providing communication between the first communication passage 42*b* and the second communication passage 43*a* via an orifice 44*c*. Accordingly, the second damping position 40*c* is further configured to connect the first hydraulic chambers (28*a*, 28*b*) of the second piston movement areas (26*a*, 26*b*) and the second hydraulic chambers (29*a*, 29*b*) of the first piston movement areas (25*a*, 25*b*) in the two tandem actuators (11, 12) so as to provide communication between the first hydraulic chambers (28*a*, 28*b*) and the second hydraulic chambers (29*a*, 29*b*) via the orifice 44*c*.

It is possible to implement an aircraft actuator 2 including a state switching valve 40 provided with a plurality of damping positions (40*b*, 40*c*) as described above. Note that the orifices (44*a*, 44*b*, 44*c*) may be fixed orifices or variable orifices.

The present invention is widely applicable as a hydraulically operated aircraft actuator for driving a control surface of an aircraft. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. A hydraulically operated aircraft actuator for driving a control surface (100) of an aircraft, comprising:

a plurality of tandem actuators (11, 12) each including two pistons (21*a*, 22*a* and 21*b*, 22*b*) and a piston rod (23*a*, 23*b*) that is arranged such that the two pistons (21*a*, 22*a* and 21*b*, 22*b*) are aligned in series, wherein the plurality of tandem actuators (11, 12) are disposed in parallel, and wherein the plurality of tandem actuators (11, 12) are hydraulically connected to each other via a plurality of hydraulic fluid communication passages (e.g., 31*a*, 31*b*; 32*a*, 32*b*; 42*a*, 42*b*; 43*a*, 43*b*), each of the plurality of tandem actuators (11, 12) is provided with a case portion (24*a*, 24*b*), inside of which two piston movement areas (25*a*, 25*b* and 26*a*, 26*b*) are defined so as to be aligned in series along the piston rod, each of the piston movement areas (25*a*, 26*a* and 25*b*, 26*b*) being provided as an area in which the piston is moved and that is divided by the piston into a first hydraulic chamber (e.g., 27*a*, 27*b* and 28*a*, 28*b*) and a second hydraulic chamber (e.g., 29*a*, 30*a*, and 29*b*, 30*b*), a rod end portion (13) is further provided that couples the respective piston rods (23*a*, 23*b*) of the plurality of tandem actuators (11, 12) on the outside of the case portions (24*a*, 24*b*) and that can be rotatably linked to the control surface (100), and, for each of the plurality of tandem actuators (11, 12), the first hydraulic chambers (e.g., 27*a*, 27*b* and 28*a*, 28*b*) disposed in the piston movement areas (25*a*, 25*b* and 26*a*, 26*b*), respectively, on the side opposite to the side on which the rod end portion (13) is provided are in communication with each other via a first hydraulic chamber communication path (35*a*), and the second hydraulic chambers (e.g., 29*a*, 30*a*, and 29*b*, 30*b*) disposed in the piston movement areas (25*a*, 25*b* and 26*a*, 26*b*), respectively, on the rod end portion (13) side are in communication with each other via a second hydraulic chamber communication path (e.g., 35*b*).

2. The aircraft actuator according to claim 1, wherein the rod end portion is provided as a block-shaped member that couples ends of the plurality of piston rods, and holds a plurality of bearing portions that are disposed respectively on axial extensions of the plurality of piston rods and are linked to the control surface side.

3. The aircraft actuator according to claim 1, further comprising:

a control valve (53) configured to control supply and discharge of pressure oil in the first hydraulic chambers (e.g., 27*a*, 28*a*, and 27*b*, 28*b*), a state switching valve (14) that is disposed between a control valve (53) and the first hydraulic chambers (e.g., 27*a*, 28*a*, and 27*b*, 28*b*) and the second hydraulic chambers (e.g., 29*a*, 30*a*, and 29*b*, 30*b*), and that is provided with a plurality of switching positions (e.g., 14*a*, 14*b*, 14*c*) to allow switching of the state of connection to the first hydraulic chambers (e.g., 27*a*, 28*a*, and 27*b*, 28*b*) and the second hydraulic chambers(e.g., 29*a*, 30*a*, and 29*b*, 30*b*), wherein the state switching valve (14) is provided with, as the switching positions (e.g., 14*a*, 14*b*, 14*c*):

a control valve connection position (e.g., 14*a*) to connect the control valve (53) to all of the first hydraulic chambers (e.g., 27*a*, 28*a*, and 27*b*, 28*b*) and all of the second hydraulic chambers (e.g., 29*a*, 30*a*, and 29*b*, 30*b*); and a damping position (14*c*) to connect the first hydraulic chambers (e.g., 27*a*, 28*a*, and 27*b*, 28*b*) to the second hydraulic chambers (e.g., 29*a*, 30*a*, and 29*b*, 30*b*) in at least one of the plurality of tandem actuators (11, 12) so as to provide communication between the first hydraulic chambers (e.g., 27*a*, 28*a*, and 27*b*, 28*b*) and the second hydraulic chambers (e.g., 29*a*, 30*a*, and 29*b*, 30*b*) via an orifice (e.g., 33*a*, 33*b*).

4. The aircraft actuator according to claim 1, wherein, in the plurality of tandem actuators, the first hydraulic chambers are in communication with each other and the second hydraulic chambers are in communication with each other in first piston movement areas, which are the piston movement areas disposed on the side opposite to the rod end portion side, and the first hydraulic chambers are in communication with each other and the second hydraulic chambers are in communication with each other in second piston movement areas, which are the piston movement areas disposed on the rod end portion side.

5. The aircraft actuator according to claim 4, wherein the case portions (24*a*, 24*b*) of the plurality of tandem actuators are formed integrally, and wherein the plurality of hydraulic fluid communication passages includes:

a communication passage (e.g., 31*a*, 31*b*; 32*a*, 32*b*; 42*a*, 42*b*; 43*a*, 43*b*) that provides communication between the first hydraulic chambers (e.g., 27*a*, 27*b*, and 28*a*, 28*b*) and between the second hydraulic chambers (e.g., 29*a*, 29*b* and 30*a*, 30*b*) of the first piston movement areas (25*a*, 25*b*), and a communication passage (e.g., 31*a*, 31*b*; 32*a*, 32*b*; 42*a*, 42*b*; 43*a*, 43*b*) that provides communication between the first hydraulic chambers (e.g., 27*a*, 27*b*, and 28*a*, 28*b*) and between the second hydraulic chambers (e.g., 29*a*, 29*b* and 30*a*, 30*b*) of the second piston movement areas (26*a*, 26*b*) are formed through the integrally formed case portions.

* * * * *